United States Patent
Yamashita et al.

[19]

[11] Patent Number: 6,141,618
[45] Date of Patent: *Oct. 31, 2000

[54] TRACTION CONTROL SYSTEM FOR VEHICLES

[75] Inventors: Tetsuhiro Yamashita, Hiroshima; Kazuaki Nada, Aichi; Hideharu Sato; Koji Hirai, both of Hiroshima, all of Japan

[73] Assignee: Mazda Motor Corporation, Hiroshima-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/414,000

[22] Filed: Mar. 30, 1995

[30] Foreign Application Priority Data

Mar. 31, 1994 [JP] Japan .................................. 6-087873
Mar. 31, 1994 [JP] Japan .................................. 6-087875
Mar. 31, 1994 [JP] Japan .................................. 6-087877

[51] Int. Cl.$^7$ .............................................. B60K 41/20
[52] U.S. Cl. ............................................. 701/84; 180/197
[58] Field of Search ...................... 364/426.01, 426.02, 364/426.03; 180/197; 701/70, 82, 84, 85, 86

[56] References Cited

U.S. PATENT DOCUMENTS

| | | | |
|---|---|---|---|
| 4,985,836 | 1/1991 | Hashiguchi et al. | 364/426.02 |
| 4,985,837 | 1/1991 | Togai et al. | 364/426.02 |
| 5,019,989 | 5/1991 | Ueda et al. | 364/426.03 |
| 5,024,285 | 6/1991 | Fujita | 364/426.03 |
| 5,051,908 | 9/1991 | Shiraishi | 364/426.03 |
| 5,151,861 | 9/1992 | Danno et al. | 364/426.02 |
| 5,243,526 | 9/1993 | Ito et al. | 364/426.03 |
| 5,255,192 | 10/1993 | Ito et al. | 364/426.03 |
| 5,379,222 | 1/1995 | Anan et al. | 364/426.03 |
| 5,400,865 | 3/1995 | Togai et al. | 364/426.03 |
| 5,472,061 | 12/1995 | Shiraishi et al. | 364/426.03 |

FOREIGN PATENT DOCUMENTS

| | | |
|---|---|---|
| 60-99757 | 6/1985 | Japan . |
| 1-269621 | 10/1989 | Japan . |
| 2-42148 | 2/1990 | Japan . |
| 2-237827 | 9/1990 | Japan . |
| 4-126636 | 4/1992 | Japan . |
| 4-183944 | 6/1992 | Japan . |

*Primary Examiner*—Gary Chin
*Attorney, Agent, or Firm*—Morrison & Foerster, LLP

[57] ABSTRACT

A traction control system for a vehicle determines a target value of engine output torque. The determined output torque is suitable for a specified target of quantitative slippage based on an effective output torque and quantitative slippage of the drive wheels. the engine is controlled so as to attain the target engine output torque, restraining an excess of driving force during an occurrence of excessive slippage of drive wheels.

24 Claims, 18 Drawing Sheets

FIG. 2

| Ne \ P | -800 | | -600 | | | -400 | | | -200 | | (mmHg) |
|---|---|---|---|---|---|---|---|---|---|---|---|
| 500 | 0 | 1.0 | 2.0 | 2.0 | 3.0 | 4.0 | 5.0 | 6.0 | 7.0 | 8.0 | 9.0 | 10 |
| 1,000 | 0 | 1.0 | 2.0 | 3.0 | 4.0 | 5.0 | 6.0 | 7.0 | 8.0 | 9.0 | 11 | 13 |
| | 0 | 1.0 | 3.0 | 4.0 | 5.0 | 6.0 | 7.0 | 8.0 | 10 | 12 | 13 | 15 |
| 2,000 | 0 | 1.0 | 3.0 | 4.0 | 6.0 | 7.0 | 8.0 | 10 | 12 | 14 | 16 | 17 |
| | 0 | 2.0 | 3.0 | 5.0 | 7.0 | 9.0 | 11 | 13 | 15 | 17 | 19 | 20 |
| 3,000 | 0 | 2.0 | 3.0 | 6.0 | 8.0 | 10 | 12 | 15 | 17 | 19 | 20 | 22 |
| | 0 | 2.0 | 3.0 | 6.0 | 8.0 | 11 | 13 | 16 | 18 | 20 | 23 | 24 |
| 4,000 | 0 | 2.0 | 4.0 | 7.0 | 9.0 | 12 | 14 | 17 | 19 | 21 | 23 | 25 |
| | 0 | 2.0 | 3.0 | 6.0 | 8.0 | 11 | 13 | 16 | 18 | 20 | 23 | 24 |
| 5,000 | 0 | 2.0 | 3.0 | 6.0 | 8.0 | 10 | 12 | 15 | 17 | 19 | 22 | 23 |
| (rpm) | 0 | 2.0 | 3.0 | 6.0 | 8.0 | 10 | 12 | 15 | 17 | 19 | 20 | 22 |

FIG. 3

| Ne \ P | -800 | | -600 | | | -400 | | | -200 | | (mmHg) |
|---|---|---|---|---|---|---|---|---|---|---|---|
| 500 | 0 | 0.9 | 1.8 | 1.8 | 2.7 | 3.6 | ... | ... | ... | ... | ... | ... |
| 1,000 | 0 | 0.9 | 1.8 | ... | ... | ... | ... | ... | ... | ... | ... | ... |
| | 0 | 0.9 | 2.7 | ... | ... | ... | ... | ... | ... | ... | ... | ... |
| 2,000 | 0 | 0.9 | 2.7 | ... | ... | ... | ... | ... | ... | ... | ... | ... |
| | 0 | 1.8 | 2.7 | ... | ... | ... | ... | ... | ... | ... | ... | ... |
| 3,000 | 0 | 1.8 | 2.7 | ... | ... | ... | ... | ... | ... | ... | ... | ... |
| | 0 | 1.8 | 2.7 | ... | ... | ... | ... | ... | ... | ... | ... | ... |
| 4,000 | 0 | 1.8 | 3.6 | ... | ... | ... | ... | ... | ... | ... | ... | ... |
| | 0 | 1.8 | 2.7 | ... | ... | ... | ... | ... | ... | ... | ... | ... |
| 5,000 | 0 | 1.8 | 2.7 | ... | ... | ... | ... | ... | ... | ... | ... | ... |
| (rpm) | 0 | 1.8 | 2.7 | ... | ... | ... | ... | ... | ... | ... | ... | ... |

FIG. 4

| Ne \ P | -800 | | | | -600 | | | | -400 | | | | -200 | | (mmHg) |
|---|---|---|---|---|---|---|---|---|---|---|---|---|---|---|---|
| 500 | 0 | 0.8 | 1.6 | 1.6 | ... | ... | ... | ... | ... | ... | ... | ... | ... | ... | ... |
| 1,000 | 0 | 0.8 | 1.6 | ... | ... | ... | ... | ... | ... | ... | ... | ... | ... | ... | ... |
|  | 0 | 0.8 | 2.4 | ... | ... | ... | ... | ... | ... | ... | ... | ... | ... | ... | ... |
| 2,000 | 0 | 0.8 | 2.4 | ... | ... | ... | ... | ... | ... | ... | ... | ... | ... | ... | ... |
|  | 0 | ... | ... | ... | ... | ... | ... | ... | ... | ... | ... | ... | ... | ... | ... |
| 3,000 | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... |
| 4,000 | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... |
| 5,000 | ... | ... | ... | ... | ... | ... | ... | ... | ... | ... | ... | ... | ... | ... | ... |
| (rpm) | ... | ... | ... | ... | ... | ... | ... | ... | ... | ... | ... | ... | ... | ... | ... |

FIG. 5

| Ne \ P | -800 | | | | -600 | | | | -400 | | | | -200 | | (mmHg) |
|---|---|---|---|---|---|---|---|---|---|---|---|---|---|---|---|
| 500 | 0 | 0.7 | 1.4 | 1.4 | ... | ... | ... | ... | ... | ... | ... | ... | ... | ... | ... |
| 1,000 | 0 | 0.7 | 1.4 | 2.1 | ... | ... | ... | ... | ... | ... | ... | ... | ... | ... | ... |
|  | 0 | 0.7 | 2.1 | 2.8 | ... | ... | ... | ... | ... | ... | ... | ... | ... | ... | ... |
| 2,000 | 0 | 0.7 | 2.1 | ... | ... | ... | ... | ... | ... | ... | ... | ... | ... | ... | ... |
|  | 0 | ... | ... | ... | ... | ... | ... | ... | ... | ... | ... | ... | ... | ... | ... |
| 3,000 | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... |
| 4,000 | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... |
| 5,000 | ... | ... | ... | ... | ... | ... | ... | ... | ... | ... | ... | ... | ... | ... | ... |
| (rpm) | ... | ... | ... | ... | ... | ... | ... | ... | ... | ... | ... | ... | ... | ... | ... |

FIG. 6

| Ne \ P | -800 | | | | -600 | | | | -400 | | | | -200 | | | | (mmHg) |
|---|---|---|---|---|---|---|---|---|---|---|---|---|---|---|---|---|---|
| 500 | 0 | 0.6 | 1.2 | 1.2 | ... | ... | ... | ... | ... | ... | ... | ... | ... | ... | ... | ... | |
| 1,000 | 0 | 0.6 | 1.2 | 1.8 | ... | ... | ... | ... | ... | ... | ... | ... | ... | ... | ... | ... | |
| | 0 | 0.6 | 1.8 | 2.4 | ... | ... | ... | ... | ... | ... | ... | ... | ... | ... | ... | ... | |
| 2,000 | 0 | 0.6 | 1.8 | 2.4 | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 3,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 4,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 5,000 | ... | ... | ... | ... | ... | ... | ... | ... | ... | ... | ... | ... | ... | ... | ... | ... | |
| (rpm) | ... | ... | ... | ... | ... | ... | ... | ... | ... | ... | ... | ... | ... | ... | ... | ... | |

FIG. 7

| Ne \ P | -800 | | | | -600 | | | | -400 | | | | -200 | | | | (mmHg) |
|---|---|---|---|---|---|---|---|---|---|---|---|---|---|---|---|---|---|
| 500 | 0 | 0.5 | 1.0 | 1.0 | 1.5 | ... | ... | ... | ... | ... | ... | ... | ... | ... | ... | ... | |
| 1,000 | 0 | 0.5 | 1.0 | 1.5 | ... | ... | ... | ... | ... | ... | ... | ... | ... | ... | ... | ... | |
| | 0 | 0.5 | 1.5 | 2.0 | ... | ... | ... | ... | ... | ... | ... | ... | ... | ... | ... | ... | |
| 2,000 | 0 | 0.5 | 1.5 | 2.0 | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 3,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 4,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 5,000 | ... | ... | ... | ... | ... | ... | ... | ... | ... | ... | ... | ... | ... | ... | ... | ... | |
| (rpm) | ... | ... | ... | ... | ... | ... | ... | ... | ... | ... | ... | ... | ... | ... | ... | ... | |

FIG. 8

| Ne \ P | -800 | | | | | -600 | | | | -400 | | | | -200 | | | (mmHg) |
|---|---|---|---|---|---|---|---|---|---|---|---|---|---|---|---|---|---|
| 500 | 0 | 0.4 | 0.8 | 0.8 | 1.2 | ... | ... | ... | ... | ... | ... | ... | ... | ... | ... | ... | ... |
| 1,000 | 0 | 0.4 | 0.8 | 1.2 | ... | ... | ... | ... | ... | ... | ... | ... | ... | ... | ... | ... | ... |
|  | 0 | 0.4 | 1.2 | 1.6 | ... | ... | ... | ... | ... | ... | ... | ... | ... | ... | ... | ... | ... |
| 2,000 | 0 | 0.4 | 1.2 | ... | ... | ... | ... | ... | ... | ... | ... | ... | ... | ... | ... | ... | ... |
|  | 0 | ... | ... | ... | ... | ... | ... | ... | ... | ... | ... | ... | ... | ... | ... | ... | ... |
| 3,000 | ... | ... | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... | ... | ... |
| 4,000 | ... | ... | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... | ... | ... |
| 5,000 | ... | ... | ... | ... | ... | ... | ... | ... | ... | ... | ... | ... | ... | ... | ... | ... | ... |
| (rpm) | ... | ... | ... | ... | ... | ... | ... | ... | ... | ... | ... | ... | ... | ... | ... | ... | ... |

FIG. 9

| Ne \ P | -800 | | | | -600 | | | | -400 | | | | -200 | | | | (mmHg) |
|---|---|---|---|---|---|---|---|---|---|---|---|---|---|---|---|---|---|
| 500 | 0 | 0.3 | 0.6 | 0.6 | ... | ... | ... | ... | ... | ... | ... | ... | ... | ... | ... | ... | ... |
| 1,000 | 0 | 0.3 | 0.6 | 0.8 | ... | ... | ... | ... | ... | ... | ... | ... | ... | ... | ... | ... | ... |
|  | 0 | 0.3 | 0.8 | 1.2 | ... | ... | ... | ... | ... | ... | ... | ... | ... | ... | ... | ... | ... |
| 2,000 | 0 | 0.3 | 0.8 | 1.2 | ... | ... | ... | ... | ... | ... | ... | ... | ... | ... | ... | ... | ... |
|  | 0 | ... | ... | ... | ... | ... | ... | ... | ... | ... | ... | ... | ... | ... | ... | ... | ... |
| 3,000 | ... | ... | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... | ... | ... |
| 4,000 | ... | ... | ... | ... | ... | ... | ... | ... | ... | ... | ... | ... | ... | ... | ... | ... | ... |
|  | ... | ... | ... | ... | ... | ... | ... | ... | ... | ... | ... | ... | ... | ... | ... | ... | ... |
| 5,000 | ... | ... | ... | ... | ... | ... | ... | ... | ... | ... | ... | ... | ... | ... | ... | ... | ... |
| (rpm) | ... | ... | ... | ... | ... | ... | ... | ... | ... | ... | ... | ... | ... | ... | ... | ... | ... |

FIG. 10

| Ne \ P | -800 | | | | -600 | | | | -400 | | | | -200 | | | | (mmHg) |
|---|---|---|---|---|---|---|---|---|---|---|---|---|---|---|---|---|---|
| 500 | 0 | 0.1 | 0.2 | 0.2 | ... | ... | ... | ... | ... | ... | ... | ... | ... | ... | ... | ... | |
| 1,000 | 0 | 0.1 | 0.2 | 0.3 | ... | ... | ... | ... | ... | ... | ... | ... | ... | ... | ... | ... | |
| | 0 | 0.1 | 0.3 | 0.4 | ... | ... | ... | ... | ... | ... | ... | ... | ... | ... | ... | ... | |
| 2,000 | 0 | 0.1 | 0.3 | 0.4 | ... | ... | ... | ... | ... | ... | ... | ... | ... | ... | ... | ... | |
| | 0 | 0.2 | ... | ... | ... | ... | ... | ... | ... | ... | ... | ... | ... | ... | ... | ... | |
| 3,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 4,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 5,000 | ... | ... | ... | ... | ... | ... | ... | ... | ... | ... | ... | ... | ... | ... | ... | ... | |
| (rpm) | ... | ... | ... | ... | ... | ... | ... | ... | ... | ... | ... | ... | ... | ... | ... | ... | |

FIG. 11

| Ne \ P | -800 | | | | -600 | | | | -400 | | | | -200 | | | | (mmHg) |
|---|---|---|---|---|---|---|---|---|---|---|---|---|---|---|---|---|---|
| 500 | 0 | 0 | 0 | 0 | 0 | ... | ... | ... | ... | ... | ... | ... | ... | ... | ... | ... | |
| 1,000 | 0 | 0 | 0 | 0 | 0 | ... | ... | ... | ... | ... | ... | ... | ... | ... | ... | ... | |
| | 0 | 0 | 0 | 0 | ... | ... | ... | ... | ... | ... | ... | ... | ... | ... | ... | ... | |
| 2,000 | 0 | 0 | 0 | ... | ... | ... | ... | ... | ... | ... | ... | ... | ... | ... | ... | ... | |
| | 0 | ... | ... | ... | ... | ... | ... | ... | ... | ... | ... | ... | ... | ... | ... | ... | |
| 3,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 4,000 | ... | ... | ... | ... | ... | ... | ... | ... | ... | ... | ... | ... | ... | ... | ... | ... | |
| | ... | ... | ... | ... | ... | ... | ... | ... | ... | ... | ... | ... | ... | ... | ... | ... | |
| 5,000 | ... | ... | ... | ... | ... | ... | ... | ... | ... | ... | ... | ... | ... | ... | ... | ... | |
| (rpm) | ... | ... | ... | ... | ... | ... | ... | ... | ... | ... | ... | ... | ... | ... | ... | ... | |

FIG. 12

MAP

| Vr \ Gv | 0 | | | | | | | (L) |
|---|---|---|---|---|---|---|---|---|
| 0 | 1 | 1 | 2 | 2 | 3 | 3 | 4 | 4 | 5 |
| | 1 | 1 | 2 | 2 | 3 | 4 | 4 | 5 | 5 |
| | 1 | 1 | 2 | 3 | 3 | 4 | 4 | 5 | 5 |
| | 1 | 1 | 2 | 3 | 4 | 4 | 5 | 5 | 5 |
| | 1 | 1 | 2 | 3 | 4 | 5 | 5 | 5 | 5 |
| | 1 | 2 | 2 | 4 | 4 | 5 | 5 | 5 | 5 |
| | 1 | 2 | 3 | 4 | 5 | 5 | 5 | 5 | 5 |
| (L) | 1 | 2 | 3 | 5 | 5 | 5 | 5 | 5 | 5 |

FIG. 13

| θ (°) | 15 | 30 | 85 | 170 | 255 | 340 | 425 | 510 |
|---|---|---|---|---|---|---|---|---|
| R(m) | 150 | 85 | 30 | 15 | 10 | 8 | 6 | 5 |

FIG. 14

| μ \ Vr | 0 | | | | | (L) |
|---|---|---|---|---|---|---|
| 1 | 10.0 | 9.0 | 7.0 | 6.0 | 5.0 | 4.0 |
| 2 | 11.0 | 10.0 | 9.0 | 8.0 | 7.0 | 6.0 |
| 3 | 12.0 | 11.0 | 10.0 | 9.0 | 8.0 | 7.0 |
| 4 | 13.0 | 12.0 | 11.0 | 10.0 | 9.0 | 8.0 |
| 5 | 14.0 | 13.0 | 12.0 | 11.0 | 10.0 | 9.0 |

| μ \ Vr | 0 | | | | | (L) |
|---|---|---|---|---|---|---|
| 1 | 3.0 | 3.0 | 2.0 | 2.0 | 1.0 | 1.0 |
| 2 | 4.0 | 4.0 | 3.0 | 3.0 | 2.0 | 2.0 |
| 3 | 5.0 | 5.0 | 4.0 | 4.0 | 3.0 | 3.0 |
| 4 | 6.0 | 6.0 | 5.0 | 5.0 | 4.0 | 4.0 |
| 5 | 7.0 | 7.0 | 6.0 | 6.0 | 5.0 | 5.0 |

FIG. 15

| Gs (g) | 0 | 0.1 | 0.3 | 0.5 | 0.7 | 0.9 | 1 |
|---|---|---|---|---|---|---|---|
| K1 | 1 | 0.9 | 0.8 | 0.7 | 0.6 | 0.5 | 0 |

| Tr (Kgfm) | 0 | ... | ... | 22 | 23 | 24 | 25 |
|---|---|---|---|---|---|---|---|
| K2 | 0.8 | ... | ... | ... | 1.5 | 3 | 5 |

FIG. 22

| μ \ Vr | 0 | → | | | | (L) |
|---|---|---|---|---|---|---|
| 1 | 5.0 | 4.0 | 3.0 | 3.0 | 3.0 | 3.0 |
| 2 | 5.0 | 4.0 | 4.0 | 3.0 | 3.0 | 3.0 |
| 3 | 5.0 | 4.0 | 4.0 | 4.0 | 3.0 | 3.0 |
| 4 | 6.0 | 5.0 | 5.0 | 4.0 | 4.0 | 4.0 |
| 5 | 6.0 | 5.0 | 5.0 | 5.0 | 4.0 | 4.0 |

| Tr(Kgfm) | 0 | ⋯ | ⋯ | 22 | 23 | 24 | 25 |
|---|---|---|---|---|---|---|---|
| K7 | 0.8 | ⋯ | ⋯ | ⋯ | 1.5 | 3 | 5 |

FIG. 23

| ΔSp \ DSp | (−) | ← | | | | → | (+) |
|---|---|---|---|---|---|---|---|
| (−) | −0.8 | −0.8 | −0.7 | −0.5 | −0.5 | −0.3 | −0.2 | 0 |
| ↑ | −0.8 | −0.7 | −0.5 | −0.3 | −0.2 | −0.1 | 0 | +0.2 |
| | −0.7 | −0.5 | −0.3 | −0.2 | −0.1 | 0 | +0.1 | +0.2 |
| | −0.5 | −0.2 | −0.2 | −0.1 | 0 | +0.1 | +0.3 | +0.3 |
| | −0.5 | −0.3 | −0.1 | 0 | +0.1 | +0.2 | +0.4 | +0.6 |
| | −0.3 | −0.1 | 0 | +0.1 | +0.2 | +0.4 | +0.5 | +0.7 |
| ↓ | −0.2 | 0 | +0.1 | +0.3 | +0.5 | +0.7 | +0.8 | +0.9 |
| (+) | 0 | +0.2 | +0.2 | +0.3 | +0.6 | +0.8 | +0.9 | +1.0 |

FIG. 25

|  | 1 | 2 | 3 | 4 | 5 | 6 | 7 | 8 | 9 | 10 |
|---|---|---|---|---|---|---|---|---|---|---|
|  | 0 | 1 | 2 | 3 | 4 | 5 | 6 | 7 | 8 | 9 |

|  | 1 | 2 | 3 | 4 | 5 | 6 |  |
|---|---|---|---|---|---|---|---|
| 0 |   |   |   |   |   |   |   |
| 1 |   |   |   |   |   |   |   |
| 2 | X |   |   |   |   |   |   |
| 3 | X |   |   |   |   |   |   |
| 4 | X | X |   |   |   |   |   |
| 5 | X | X |   |   |   |   |   |
| 6 | X | X | X |   |   |   |   |
| 7 | X | X | X | X |   |   |   |
| 8 | X | X | X | X | X |   |   |
| 9 | X | X | X | X | X | X |   |

TRACTION CONTROL SYSTEM FOR VEHICLES

BACKGROUND OF THE INVENTION

1. Field of the Invention

The present invention relates to a traction control system for controlling an engine to restrain driving force of a vehicle during excessive or over slippage.

2. Description of Related Art

Automotive vehicles are typically provided with traction control features for preventing aggravation of acceleration due to slippage caused by excessively increased driving torque during acceleration. Traction control is effected by lowering engine output torque or applying braking force to drive wheels upon an occurrence of over slippage of the drive wheels due to excessive driving force so as to achieve a desired amount of slippage of the drive wheels. Such traction control is executed in various modes according to driving conditions and various intentions.

In an attempt to yield the compatibility of driving and acceleration performance regardless of driving loads on a vehicle, the traction control regulates engine output torque more leniently with an increase in driving load. In order to keep acceleration performance during a small size of opening of an acceleration throttle valve, a threshold for a commencement decision of the traction control is changed larger with a decrease in engine output torque. In another control mode, in an attempt to prevent a delay of recovery of engine output torque on a demand of high engine output torque, commencement of throttle valve control is delayed when engine output torque is high. Further, in order for a vehicle to have improved stability of driving and acceleration performance, a drop in engine output torque is reduced according to increases in the coefficient of road surface friction.

Under high engine output torque where acceleration is permitted, if the traction control is executed frequently, acceleration is rather aggravated. If target engine output torque is set lower in vain, a sharp engine output torque drop is produced leading to aggravation of acceleration. Further, a long time of engine output control is undesirable for the traction control in terms of aggravation of acceleration. On the other hand, when slippage develops under relatively low engine output torque, in order for vehicles to be prevented from loosing running stability, the traction control is necessary to be executed. From these points of view, the prior art traction control still involve disadvantages. For example, in the traction control where lenient engine output control is conducted according to driving loads or an engine output torque drop is reduced according to an increase in the coefficient of road surface friction, because of a lack of consideration of driving conditions under which the traction control is executed, the traction control is executed at frequent intervals and for a long time, resulting in aggravation of acceleration. In the traction control where the lower the engine output torque is, the larger the threshold for the commencement decision of the traction control is changed, it is hard to execute promptly the traction control whenever unsteady running occurs. In the traction control where a delay of commencement of the throttle valve control takes place, because there is no consideration about any target of engine output torque in addition to traction control conditions, the traction control suffers significant aggravation of acceleration due to a sharp engine output torque drop.

Vehicles with traction control features often experience acceleration during cornering. In such an event, if acceleration takes place near at a limit in road gripping ability of drive wheels, cornering force acting on the drive wheels becomes less than a lateral acceleration of the vehicle, leading to a pull of, for instance, rear wheels of a rear drive vehicle toward the outside which is so called over steered cornering or a cornering skid. In order to avoid such over steered cornering, one of the prior art traction control regulates engine output torque such that effective drive axle torque agrees approximately with target drive axle torque, which is established according to depressed strokes of an accelerator pedal, so that maximum permissible driving force is not exceeded.

While such the traction control prevents vehicles from being pulled toward the outside during cornering and, consequently, provides the stability of running due to engine output torque not exceeding driving force. However, because of a lack of consideration of variations of cornering characteristics, there are potentially caused slippage and aggravation of acceleration during sharp cornering. Specifically, when sharp cornering takes place on a road with a low surface friction coefficient $\mu$, vehicle is strikingly unstable, the vehicle gets into a skid with a high probability. In such an event, if front wheels skid, the vehicle undergoes a sudden change of cornering characteristics from a tendency to be slightly under steered to a tendency to be inordinately over steered. On the other hand, if rear wheels skid, there occurs a tendency for the vehicle to encounter inordinate over steering. It is hard to ascertain such a change of cornering characteristics based only on a lateral acceleration, imposing a great burden on the driver. Although it is thought to drop engine output torque impartially during cornering, this however leads to aggravation of acceleration during a negotiation around a slow curve at relatively high speeds.

SUMMARY OF THE INVENTION

It is an object of the present invention to provide a traction control system with a high reliability which executes engine output torque control less frequently under conditions where acceleration is permitted so as to retain high acceleration performance and conduct prompt engine control when there is a demand of stable running.

It is another object of the present invention to provide a traction control system which executes engine output control appropriately for various running conditions.

The above object of the present invention is achieved by providing a traction control system for a vehicle for controlling engine output torque during an occurrence of excessive slippage of drive wheels so as to restrain an excess of driving force. The traction control system determines a target value of engine output torque suitable for a specified target of quantitative slippage based on effective output torque detected by an engine output detection means and quantitative slippage of the drive wheels, relative to a road surface on which the vehicle runs, detected by a slippage detection means and then, controls the engine so as to attain the target engine output torque, thereby restraining an excess of driving force. Specifically, the traction control system, which is organized mainly by a microcomputer, is loaded with a plurality of engine output torque maps which define engine output torque, as torque drops, according to various engine driving conditions, such as engine speeds of rotation and engine loads. Engine output torque meeting an actual engine driving condition contained in the engine output torque maps is compared with the target engine output torque, and any one of the engine output torque maps which contains engine output torque the closest to the target engine output torque is selected for the determination of an engine control level or how much engine output torque is dropped.

The traction control system reflects engine driving conditions, providing a precise traction control. The utilization of the engine output torque maps defining torque down levels simplifies the structure of the traction control system. In particular, because these engine output torque maps provide the torque down levels for various engine driving conditions using engine speeds and engine loads as parameters, the engine output torque defined in the engine output torque maps agree accurately with the target engine output torque, yielding an improved accuracy of traction control without any necessity of complicated structures for the control systems.

Each engine output torque map may define an area for engine driving conditions under which the torque down control is prohibited. If strictly defining such a prohibition area of torque down control in every engine output torque map, the torque down control is rendered executive in an expanded extent. In the event where the engine output torque maps define the torque down levels with engine speeds and engine loads as parameters, the prohibition area of torque down control can be defined more strictly in each engine output torque map, so that the extent of execution of the torque down control is expanded more broadly. Further, when an actual engine driving condition falls in the torque down prohibition area of an engine output torque map, the engine is controlled at a torque down level defined by another engine output torque map which does not includes the actual driving condition in its torque down prohibition area, the traction control is consequently prevented from being reluctantly suspended and resuming thereafter. This results in controlling a sharp change in engine output torque, imposing a less burden on the driver.

One or more of such parameters as a threshold for a commencement decision of the engine output control, a threshold for a termination decision of the engine output control and the target engine output torque, may be changed larger when the effective engine output torque is high than when it is low. In this case, when the vehicle is ready for acceleration under high engine output torque, the raised thresholds render the torque down control to be less frequently executed and terminates it in a shortened time. Otherwise, the raised target engine output torque lowers a rate of engine torque down, suppressing aggravation of acceleration. On the other hand, when the effective engine output torque is relatively low, these parameters are not changed large, so that the torque down control promptly commences and does not terminate in a short time. This provides a sufficient drop in engine output torque, recovering certainly the stability of vehicle during running.

Further, according to another embodiment, the traction control system, in an event of an amount relating to turn of the vehicle which is determined based on an steered angle and a vehicle speed, is higher than a predetermined amount, controls the engine so as to reduce effective engine output torque more when the effective engine output torque is less than a predetermined torque than when it is greater than the predetermined torque, or otherwise controls the engine so as to increase effective engine output torque more higher when the effective engine output torque is greater than a predetermined torque than when it is less than the predetermined torque.

With this traction control system, even when the vehicle experiences a sudden change of cornering characteristics due to accidental slippage during cornering, the engine lowers its output torque, so as to increase the stability of running and reduce a burden on the driver.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIGS. 2 through 11 show No. 10 to No. 10 engine output torque maps defined by engine speed and intake air pressure as parameters;

FIG. 12 shows a map of a road surface friction efficiency by vehicle speed and lateral acceleration as parameters;

FIG. 13 shows a table of the radius of turning;

FIG. 14 shows tables of a control commencement threshold and a control termination threshold, respectively;

FIG. 15 shows maps of torque correction factors K1 and K2, respectively;

FIG. 22 shows maps of target quantitative slippage and torque correction factor K7, respectively;

FIG. 23 shows a map of torque down factor K;

FIG. 25 shows maps of engine control level L and fuel cut pattern;

DETAILED DESCRIPTION OF THE PREFERRED EMBODIMENTS

Figure 1:
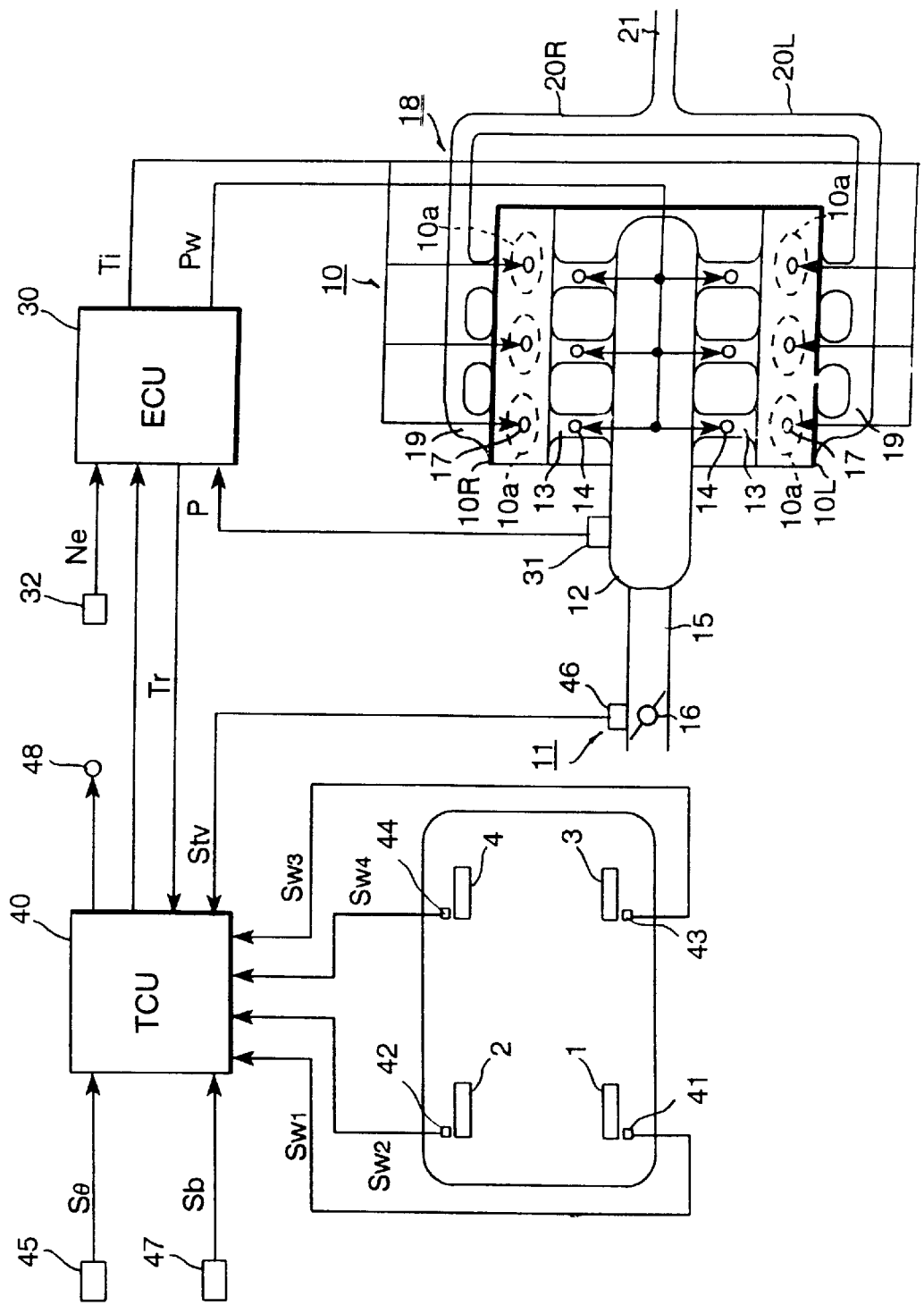
FIG. 1 is a schematic illustration of a traction control system in accordance with a preferred embodiment of the present invention.

Referring now to the drawings in detail, and in particular, to FIG. 1, a four-wheel drive vehicle having a traction control system in accordance with a preferred embodiment of the present invention is schematically shown. The four-wheel drive vehicle has a V-type, six-cylinder engine 10 including a left and right cylinder banks 10L and 10R arranged in a V-formation with a predetermined relative angle, for instance, a relative angle of 60 degrees. Three cylinders 10a are formed in a row in the left cylinder bank 10L. Similarly, the remaining three cylinders 10a are formed in a row in the right cylinder bank 10R. The engine 10 has an intake system 11 and an exhaust system 18. The intake system 10 includes a main intake pipe 15 provided with a surge tank 12 and individual intake pipes 13 disposed between the surge tank 12 and the respective cylinders 10a, respectively. Each of these individual intake pipe 13 is provided with a fuel injection valve 14. The main intake pipe 15 is provided with a throttle valve 16 adjustable in throttle opening for controlling the amount of fuel mixture that reaches the cylinders 10a so as to regulate engine output torque. The engine has an ignition plug 17 for each cylinder 10a. The exhaust system 18 includes individual exhaust pipes 19, three of which extend from the respective cylinders 10a of the left cylinder bank 10L and are merged together as a left upstream exhaust pipe 20L and the remaining three of which extend from the respective cylinders 10a of the left cylinder bank 10L and are merged together as a right upstream exhaust pipe 20R. Further, these left and right upstream exhaust pipes 20L and 20R are merged together as a downstream exhaust pipe 21. The downstream exhaust pipe 21 is provided with a catalytic converter (not shown) for purifying exhaust gases.

The engine 10 is controlled by an engine control unit (ECU) 30 and a traction control unit (TCU) 40 which are interfaced to transmit signals to and receive signals from each other. Each of these control units 30 and 40 is organized mainly by a microcomputer. The engine control unit 30 receives various signals, including a signal representing the pressure of intake air P from a pressure sensor 31 provided in the surge tank 12 and a signal representing the rotational speed of engine Ne from a speed sensor 32 provided in association with the engine 10. Based on these pressure signal P and engine speed signal Ne, the engine control system 30 controls an ignition timing at which the ignition plugs 17 are fired and the amounts of fuel delivered through the fuel injection valves 14. A signal representing effective engine output torque Tr is transmitted to the traction control unit 40 from the engine control system 30. Specifically, the engine control unit 30 determines an optimum ignition timing Ti with reference to an ignition timing map according to these air pressure P and engine speed Ne and provides for each ignition plug 17 a signal at the optimum ignition timing. Together, the engine control system 30 determines a basic amount of fuel to be delivered to the cylinder 10a based on these air pressure P and engine speed Ne and an effective amount of fuel to be delivered to the cylinder 10a. The effective amount of fuel to be delivered to the cylinder 10a, which is represented by a pulse width Pw, is defined as the product of a basic amount of fuel and a correction factor depending upon the temperature of engine coolant which is detected by a temperature sensor (not shown) and a signal of which is sent to the engine control unit 30. On the other hand, the traction control unit 40 receives various signals, including signals representing the speeds of drive and driven wheels 1–4 from speed sensors 41–44, a signal representing an steered angle θ from an angle sensor 45, a signal Stv representing an idle position of the throttle valve 16 from an idle position sensor 46, and a signal Sb representing application of a brake (not shown) from a brake position sensor 47. Together, the traction control unit 40 receives a signal of the effective engine output torque Tr transmitted from the engine control system 30. Based on these signals, the traction control unit 40 executes a traction control under certain driving conditions and lights a lamp 48. In this instance, the traction control is a control of engine output torque through the engine control unit 30. These sensors are well known in the art and may take any well known types.

In order for the engine control unit 30 to provide a signal of effective engine output torque Tr, there are prepared maps of experimental engine output torque Ter defined according to the pressure of intake air P and the rotational speed of engine Ne as parameters under various driving conditions, such as shown in FIGS. 2–11. These engine output torque maps have specific map numbers, respectively. In this instance, the pressure of intake air P is defined based on a standard atmospheric pressure. The experimental engine output torque Ter are mapped for various combinations of intake air pressures P and engine speeds Ne under ordinary driving conditions in the first engine output torque map shown in FIG. 2 and under engine driving conditions, where ignition is made at a retarded timing, in the second engine output torque map shown in FIG. 3. Similarly, the experimental engine output torque Ter are mapped under engine driving conditions, where fuel delivery through one out of the six fuel injection valves 14 is suspended, in the third engine output torque map shown in FIG. 4; under engine driving conditions, where an ignition time is retarded and fuel delivery through one out of the six fuel injection valves is suspended, in the fourth engine output torque map shown in FIG. 5; under engine driving conditions, where fuel delivery through two out of the six fuel injection valves are suspended, in the fifth engine output torque map shown in FIG. 6; under engine driving conditions, where ignition is made at a retarded timing and fuel delivery through two out of the six fuel injection valves are suspended, in the sixth engine output torque map shown in FIG. 7; under engine driving conditions, where fuel delivery through three out of the six fuel injection valves are suspended, in the seventh engine output torque map shown in FIG. 8; under engine driving conditions, where fuel injection through four out of the six fuel injection valves are suspended, in the eighth engine output torque map shown in FIG. 9; under engine driving conditions, where fuel injection through five out of the six fuel injection valves are suspended, in the eighth ninth engine output torque map shown in FIG. 10; and under engine driving conditions, where fuel injection through all of the six fuel injection valves are suspended, in the tenth engine output torque map shown in FIG. 11. In each of the first to tenth engine output torque maps, there is defined an area, which is shaded, for prohibition of torque down control. The engine control unit 30 executes a routine for selecting one out of the first to tenth engine output torque maps and searches the selected map so as to find an experimental engine output torque Ter, as an effective engine output torque, meeting the driving condition defined by an air pressure P and an engine speed Ne. For example, when the engine 10 runs under the ordinary driving conditions, the engine control unit 30 selects the first engine output torque map and reads, as effective engine output torque Ter, experimental engine output torque Ter of 4.0 Kg for an air pressure of −600 mmHg and an engine speed of 2,000 rpm.

The traction control system 40 receives wheel speed signals, a steering angle signal and a signal of effective engine output torque Tr transmitted from the wheel speed sensors 41–44, the steering angle sensor 45 and the engine control system 30, respectively, with a predetermined period of, for instance, approximately 7 ms. and, based on these parameters, calculates vehicle speed Vr of the vehicle, a surface friction coefficient $\mu$ of a road on which the vehicle runs, longitudinal and lateral accelerations Gv and Gs of the vehicle, quantitative slippage and accelerations of the drive wheels (which are hereafter referred to as drive wheel quantitative slippage Sp1 and Sp2 and drive wheel accelerations A1 and A2, respectively) basically for the vehicle speed Vr. Together, the traction control unit 40 establishes various thresholds for the traction control. Specifically, the traction control unit 40 calculates a longitudinal acceleration Gv on the basis of a change in the vehicle speed Vr for which either one of driven wheel speeds W3 and W4 of the driven wheels 3 and 4 that is, for example, lower than the other is substituted. According to these vehicle speed Vr and longitudinal acceleration Gv, a friction coefficient map prepared with regard to vehicle speed Vr and longitudinal acceleration Gv as parameters, such as shown in FIG. 12, is searched to find a road surface friction coefficient $\mu$. As apparent in FIG. 12, the higher at least either one of the vehicle speed Vr and the longitudinal acceleration Gv is, the larger the road surface friction coefficient $\mu$ is. Further, a lateral acceleration Gs is calculated from the following equation (I):

$$Gs=(Vr)^2/127R \qquad (I)$$

where R is the radius of turn R for an steering angle $\theta$. In this instance, the radius of turn R is found according to an absolute value of the steered angle $\theta$ by searching a radius map prepared with regard to angles of steering such as shown in FIG. 13. Subsequently, a first control commencement threshold Ss is calculated for a commencement decision of the traction control from the following equation (II):

$$Ss=Sso \cdot K1 \cdot K2 \qquad (II)$$

where Sso is the basic first control commencement threshold;

K1 is the correction factor for lateral acceleration; and

K2 is the correction factor for engine output torque.

The basic first control commencement threshold Sso is found according to the vehicle speed Vr and the road surface friction coefficient $\mu$ by searching a threshold map prepared with regard to vehicle speeds and friction coefficients $\mu$ such as shown in FIG. 14. The lateral acceleration correction factor K1 is predetermined such that it decreases with an increase in lateral acceleration Gs such as shown in FIG. 15. The engine output torque correction factor K2 is predetermined such that it increases with an increase in effective engine output torque Tr as shown in FIG. 15. Accordingly, as is verified from the equation (II), the first control commencement threshold Ss is determined to be larger when the effective engine output torque Tr is relatively high than when it is relatively low.

Similarly, the control termination threshold Se is calculated for a termination decision of the traction control from the following equation (III):

$$Se=Seo \cdot K1 \cdot K2 \qquad (III)$$

where Seo is the basic control termination threshold.

The basic control termination threshold Seo is found according to the vehicle speed Vr and the road surface friction coefficient $\mu$ by searching a threshold map prepared with regard to vehicle speeds and road surface friction coefficients $\mu$ such as shown in FIG. 14. Accordingly, the control termination threshold Se increases with an increase in the effective engine output torque Tr. In this instance, as apparent from FIG. 14, the basic control termination threshold Seo is established smaller than the basic first control commencement threshold Sso.

In addition to the first control commencement threshold Ss, another, namely second, control commencement threshold As is calculated for another commencement decision of the traction control from the following equation (IV):

$$As=Aso \cdot K1 \cdot K2 \qquad (IV)$$

where Aso is the basic second control commencement threshold.

The basic second control commencement threshold Aso is an invariable. As is verified from the equation (IV) including the engine output torque correction factor K2 as a parameter, the second control commencement threshold As is determined to be larger when the effective engine output torque Tr is relatively high rather than when it is relatively low.

For the judgement of slippage made in the traction control unit 40, quantitative slippage Sp1 and Sp2 and accelerations A1 and A2 of the drive wheels 1 and 2 are calculated. The quantitative slippage Sp1 of the left drive wheel 1 is defined as a difference of the drive wheel speed W1 from the vehicle speed Vr. Similarly, the quantitative slippage Sp2 of the right drive wheel 2 is defined as a difference of the drive wheel speed W2 from the vehicle speed Vr. Then, on one hand, an arithmetical mean of quantitative slippage Spv is calculated from these quantitative slippage Sp1 and Sp2 and, on the other hand, either one of the quantitative slippage Sp1 and Sp2 that is larger than the other is assigned as the greatest quantitative slippage SHi. The acceleration A1 of the drive wheel 1 is defined as a speed difference of the latest wheel speed W1 from the preceding wheel speed W1. Similarly, the acceleration A2 of the drive wheel 2 is defined as a speed difference of the latest wheel speed W2(k) from the preceding wheel speed W2(k-1). Practically, the acceleration is obtained by dividing the speed difference by a time for one cycle. A decision of quantitative slippage is given against the drive wheels 1 and 2 if these drive wheel accelerations A1 and A2 are higher than the second control commencement threshold As or if the greatest quantitative slippage SHi is larger than the first control commencement threshold Ss. On the other hand, a decision of not slippage is given against the drive wheels 1 and 2 if the greatest quantitative slippage SHi is smaller than the first control commencement threshold Ss. The traction control unit 40 sets up a slippage decision flag Fs to a state of 1 (one) upon the decision of slippage and reset it down to a state of 0 (zero) upon the decision of not slippage. The traction control is commenced after setting up a traction control flag Ft while the slippage decision flag Fs is set up and terminated at the expiration of a predetermined queuing time t after having reset down the slippage decision flag Fs. The traction control is forced to terminate when the traction control flag Ft is reset down resulting from a detection of releasing an acceleration pedal (not shown) by the idle position sensor 46 or from a detection of the application of brake by the brake sensor 47.

Figure 16:
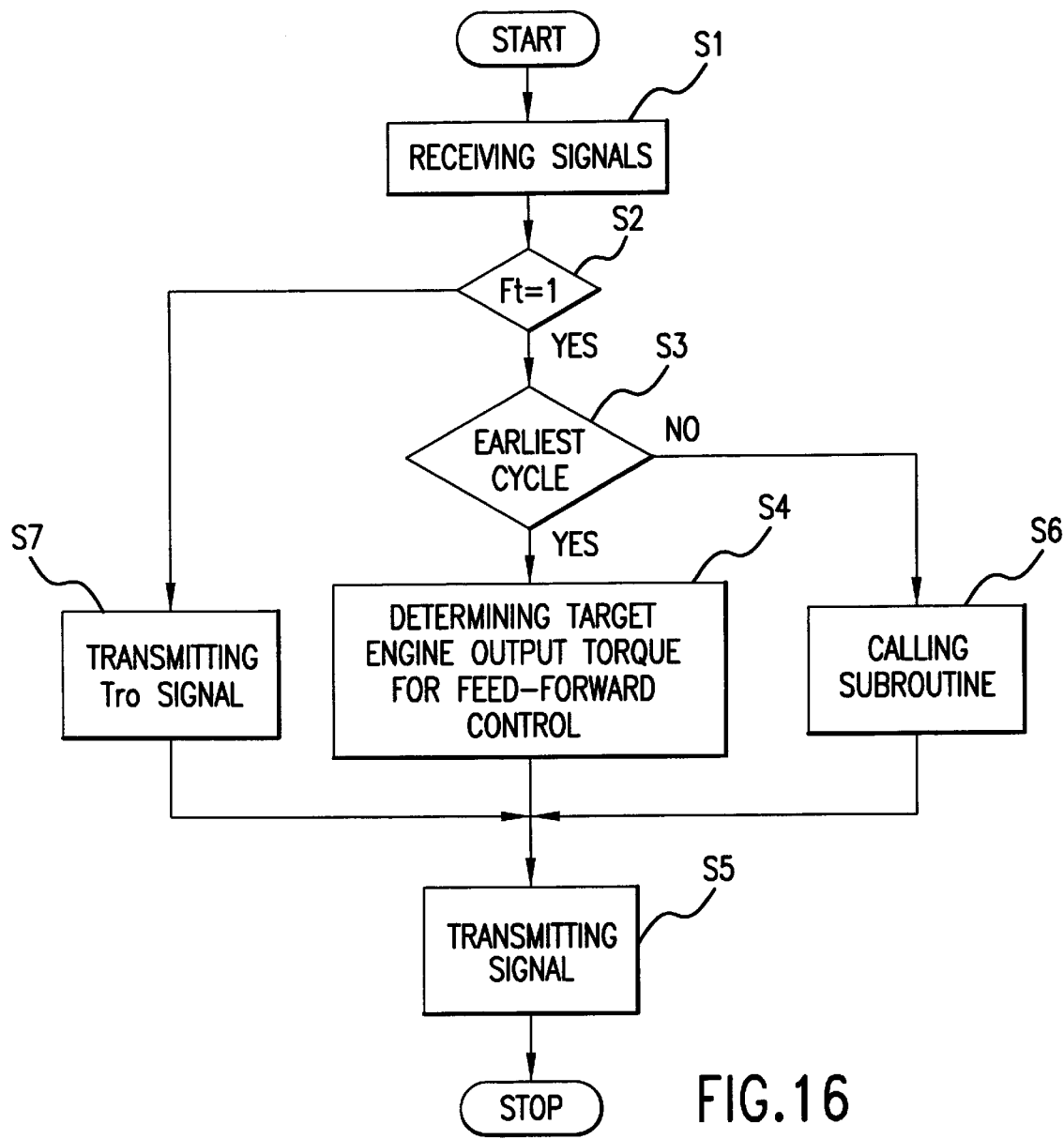
FIG. 16 is a flow chart illustrating an engine control main routine for traction control executed by a traction control unit.
Figure 21:
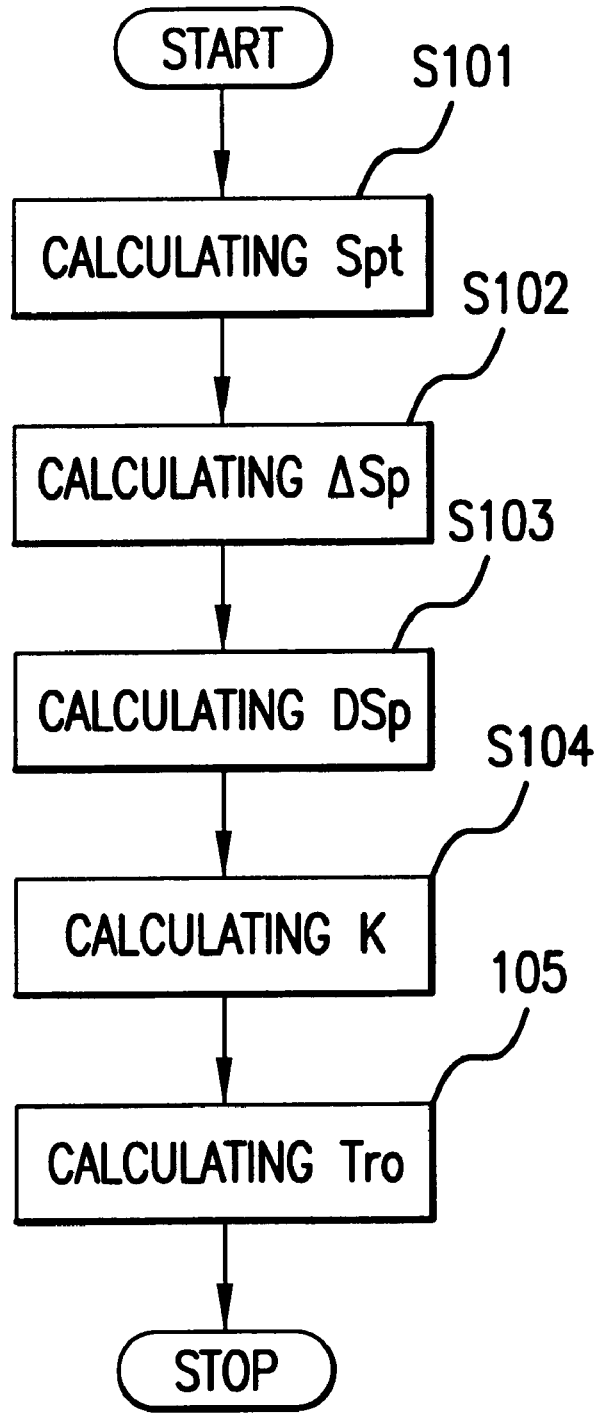
FIG. 21 is a flow chart illustrating a subroutine for the determination of target engine output torque.

The operations of the traction control system depicted in FIG. 1 is best understood by reviewing FIGS. 16, 21 and 22, which are flow charts illustrating various routine and subroutines for microcomputers of the engine control unit 30 and the traction control unit 40. Programming a computer is a skill well understood in the art. The following description is written to enable a programmer having ordinary skill in the art to prepare an appropriate program for the microcomputers. The particular details of any such program would of course depend upon the architecture of the particular computer selected.

Traction Control Main Routine

Referring now to FIG. 16, which is a flow chart of the main or general sequence routine for the microcomputer of the traction control unit 40, when the main routine commences and control passes directly to a function block at step S1 where various signals are input from various sensors, including at least the speed sensors 41–44, the steering angle sensor 45, the idle position sensor 46 and the brake position sensor 47. At step S2, a decision is made as to whether the traction control flag Ft has been set up to the state of 1 (one) which indicates that the traction control is under execution. If the answer to the decision is "YES," then, another decision is made at step S3 as to whether the traction control now taking place is in the earliest cycle, i.e. it is immediately after the commencement of the traction control. If the answer to the decision is "YES," i.e. it is the first execution of the traction control, a target engine output torque Tro for engine output torque feed-forward control is determined at step 57.

The feed-forward control target engine output torque Tro is calculated from the following equation (V):

$$Tro=Tr-Tr \cdot K3 \cdot K4 \cdot K5 \cdot K6 \qquad (V)$$

where K3 is the correction factor for engine output torque;

K4 is the correction factor for vehicle speed;

K5 is the correction factor for lateral acceleration: and

K6 is the correction factor for road surface friction coefficient $\mu$.

Figure 17:
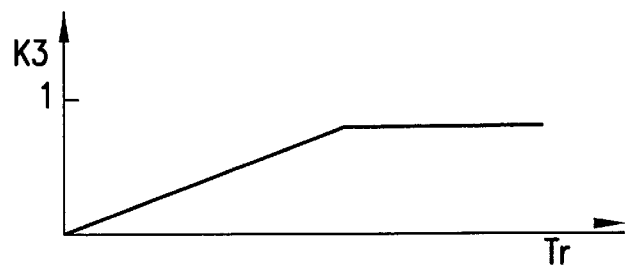
FIG. 17 is a diagram showing a engine output torque correction factor K3 used to determine target engine output torque in feed-forward control.
Figure 18:
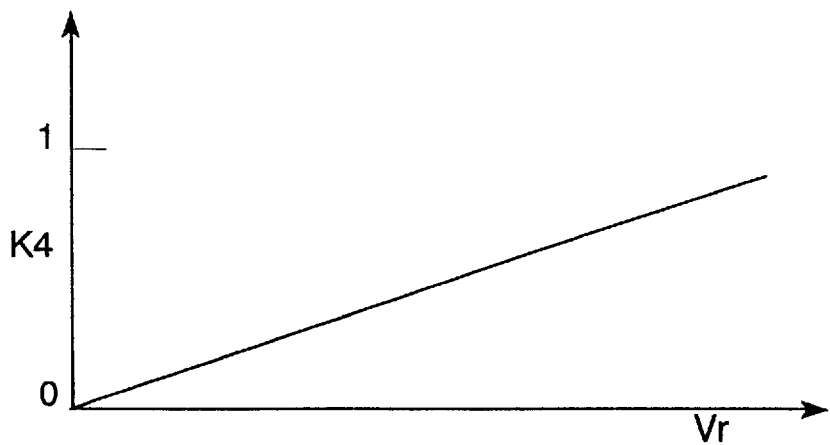
FIG. 18 is a diagram showing a vehicle speed correction factor K4 used to determine target engine output torque in feed-forward control.
Figure 19:
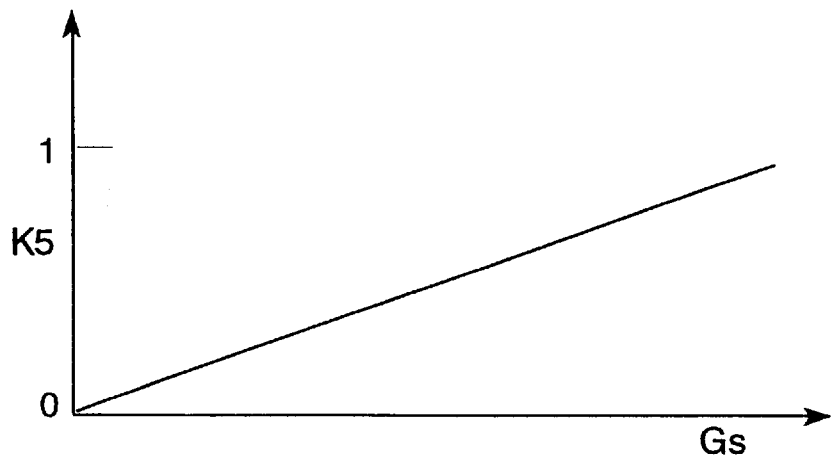
FIG. 19 is a diagram showing a lateral acceleration correction factor K5 used to determine target engine output torque in feed-forward control.
Figure 20:
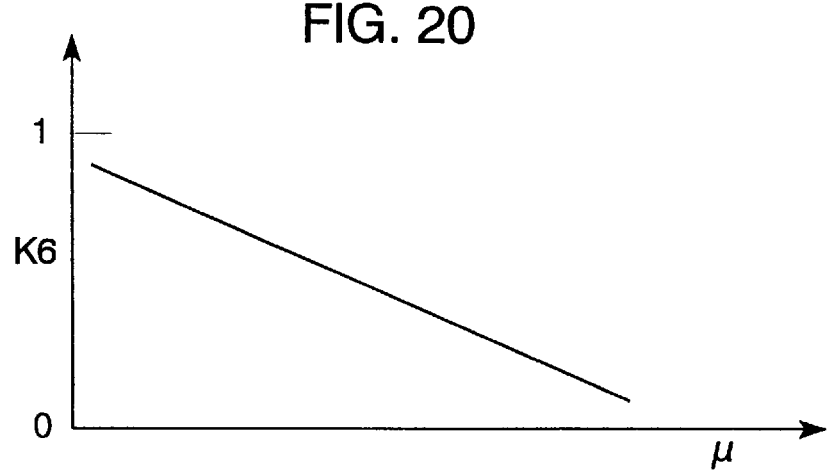
FIG. 20 is a diagram showing a surface friction coefficient correction factor K6 used to determine target engine output torque in feed-forward control.

These correction factors K3–K6 are found by looking up respective tables shown in FIGS. 17–20. As shown in FIG. 17, the engine output torque correction factor K3 increases linearly with an increase in the effective engine output torque Tr until a certain torque and remains constant for above the certain torque. The vehicle speed correction factor K4 increases linearly as the vehicle speed Vr increases as shown in FIG. 18. Similarly, the lateral acceleration correction factor K5 increases linearly as the lateral acceleration Gs as shown in FIG. 19. Further, as shown in FIG. 20, the road surface friction coefficient correction factor K6 decreases linearly as the road surface friction coefficient $\mu$ increases. All these correction factors K1–K6 are predetermined to be less than 1 (one). Accordingly, the target engine output torque Tro is less than any effective engine output torque Tr.

After the determination of the target engine output torque Tro, a signal representing the target engine output torque Tro is transmitted to the engine control unit 30 at step S5.

On the other hand, if the answer to the decision made at step S3 is "NO," this indicates that the traction control has been performed at least one time, then, a target engine output torque determination subroutine for engine output torque feedback control is called for at step S6.

Target Engine Output Torque Determination Subroutine

Referring now to FIG. 21, which is a flow chart of the target engine output torque determination subroutine for determining target engine output torque Tro used in feedback control for the microcomputer of the traction control unit 40, the first step at step S101 in FIG. 21 is to calculate target quantitative slippage Spt from the following equation (VI):

$$Spt=Spo \cdot K1 \cdot K7 \qquad (VI)$$

where Spo is the basic target quantitative slippage; and

K7 is the correction factor for engine output torque. The basic target quantitative slippage Spo is found from a quantitative slippage map prepared with regard to vehicle speed Vr and road surface friction coefficient $\mu$ as parameters such as shown in FIG. 22. The engine output torque correction factor K7 is predetermined such that it increases with an increase in effective engine output torque Tr as shown in FIG. 22. As is verified from the equation (VI), the target quantitative slippage Spt is determined to be larger when the effective engine output torque Tr is relatively high than when it is relatively low.

A quantitative slippage deviation $\Delta$Sp of the mean quantitative slippage Spv from the target quantitative slippage Spt is calculated from the following equation (VII) at step S102 and subsequently, a quantitative slippage change DSp per unit time is calculated as a quantitative slippage difference of the latest quantitative slippage deviation $\Delta$Sp(k) from the preceding quantitative slippage deviation $\Delta$Sp(k–1) as expressed by the following equation (VIII) at step S103:

$$\Delta Sp=Spv-Spt \qquad (VII)$$

$$DSp=\Delta Sp(k)-\Delta Sp(k-1) \qquad (VIII)$$

At step S104, a torque down factor K is found from a torque down factor map with respect to these quantitative slippage deviation $\Delta$Sp and quantitative slippage change DSp, such as shown in FIG. 23. Finally, a target engine output torque Tro is calculated from the following equation (IX) at step S5:

$$Tro=Tr-Tr \cdot K=Tr(1-K) \qquad (IX)$$

The final step orders return to the main routine, after the step in the main routine calling for the target engine output torque determination subroutine.

As apparent from the equation (IX), the target engine output torque Tro takes a value less than the effective engine output torque Tr for positive torque down factors K and, on the other hand, a value higher than the effective engine output torque Tr for negative torque down factors K. Further, the target engine output torque Tro increases with an increase in the effective engine output torque Tr. In this instance, the target engine output torque Tro is 0 (zero) for a torque down factor K of +1.0. In the target engine output torque determination subroutine, because the higher the effective engine output torque Tr is, the larger the target quantitative slippage Spo is established, the quantitative slippage deviation $\Delta$Sp of the mean quantitative slippage Spv from the target quantitative slippage Spo takes a smaller value. This provides a smaller torque down factor K, establishing high target engine output torque Tro.

Main Routine—continued

Referring back to the main routine in FIG. 16, if the answer to the first decision regarding the traction control flag Ft, then, the effective engine output torque Tr, a signal of which is transmitted from the engine control unit 30, is substituted for the target engine output torque Tro at step S7. Thereafter, a signal of representing the target engine output torque Tro is transmitted to the engine control unit 30.

Engine Output Torque Control Routine

Figure 24:
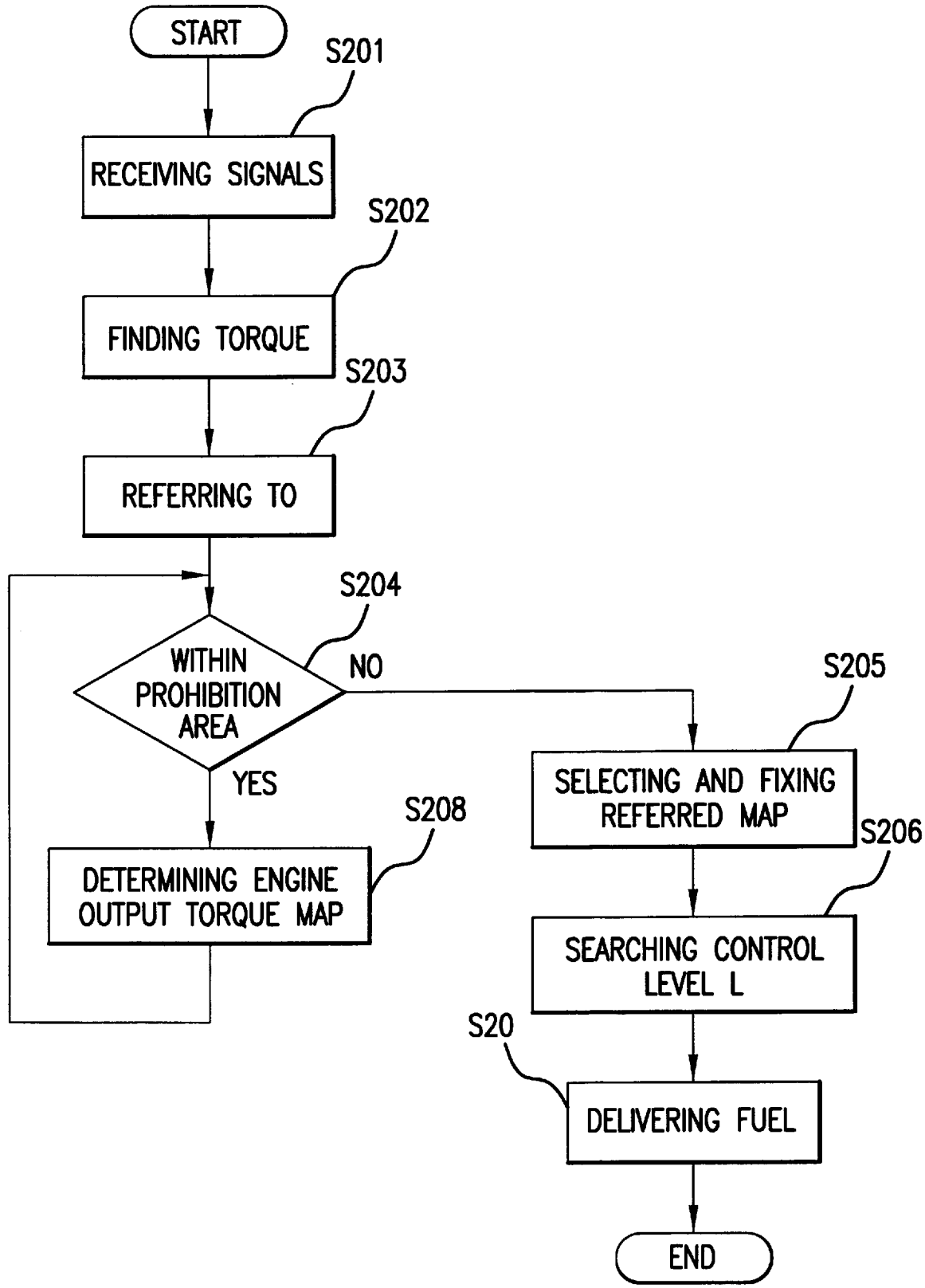
FIG. 24 is a flow chart illustrating an engine control routine for traction control executed by an engine control unit.

Referring to FIG. 24, which is a flow chart of the engine output control routine for the microcomputer of the engine control unit 30, when the engine control routine commences and control passes directly to a function block at step S201 where various signals are input from various sensors, including at least the pressure sensor 31 and the speed sensor 32. The first to tenth engine output torque maps are accessed to find all mapped engine output torque meeting the engine driving condition defined by these air pressure P and engine speed Ne, detected by these sensors 31 and 32, respectively, at step S202. Subsequently, at step S203, an engine output torque map containing mapped engine output torque equal or approximately equal, or otherwise the closest, to the target engine output torque Tro determined in the torque control unit 40, is tentatively referred to. A decision is subsequently made at step S204 as to whether the engine driving condition represented by the closest engine output torque falls within the torque down prohibition area. If the answer to the decision is "NO," then, the engine output torque map referred is selected and fixed at step S205. At step S206, with reference to the map number of the selected engine output torque map, a control level L is searched in a control level map in which ten control levels are assigned to the respective engine output torque maps, respectively, such as shown in FIG. 25. Thereafter, at step S207, fuel is delivered to the engine 10 in a fuel injection pattern defined by the control level L.

Fuel injection patterns are predetermined for the respective control levels and mapped as an injection pattern map such as shown in FIG. 25. The engine output torque control is practically performed by cutting off fuel delivery to some of the cylinders 10a according to the fuel injection patterns. A cylinder to which fuel delivery is cut off is marked with a cross (x) in the injection pattern map. In the injection pattern map, the number of fuel cut cylinders increases so as to gradually increase an engine output drop with progress of the control level number from the level L of "0" toward the level L of "9". An engine output torque drop is enhanced when ignition is made at a retarded timing as long as the number of cylinders is identical. In this instance, the control level L of "0" is assigned to ordinary engine driving conditions where fuel delivery is not cut off from all of the cylinders with no retardation of ignition timing. In other words, as the target engine output torque Tro increases, an engine output torque drop is decreased. The map number of a selected engine output torque map that is selected becomes smaller from the highest map number L of "9" toward to the lowest map number L of "0" as a target engine output torque Tro determined in the traction control unit 40 changes higher, designating a lower number of control level L so that an engine output torque drop changes smaller. Accordingly, since an engine output torque drop is suppressed more prominently when an effective engine output torque Tr is relatively high than when relatively low, an acceleration loss is decreased when the vehicle is ready for acceleration, preserving a favorable acceleration performance.

On the other hand, if the answer to the decision made at step S204 regarding engine driving condition in regard to the torque down prohibition area is "YES," then, an engine output torque map having a map number less by one (1) than the map number of the engine output torque map previously referred at step S203 is referred at step S208 to determine an engine output torque map containing a mapped engine output torque equal, or otherwise approximately equal or closest, to the target engine output torque Tro. As to the closest engine output another decision is made at step S204. These decision and map replacement at steps S204 and S208 are repeated until the engine driving condition represented by the closest engine output torque falls within the torque down prohibition area of the referred engine output torque map.

Figure 26:
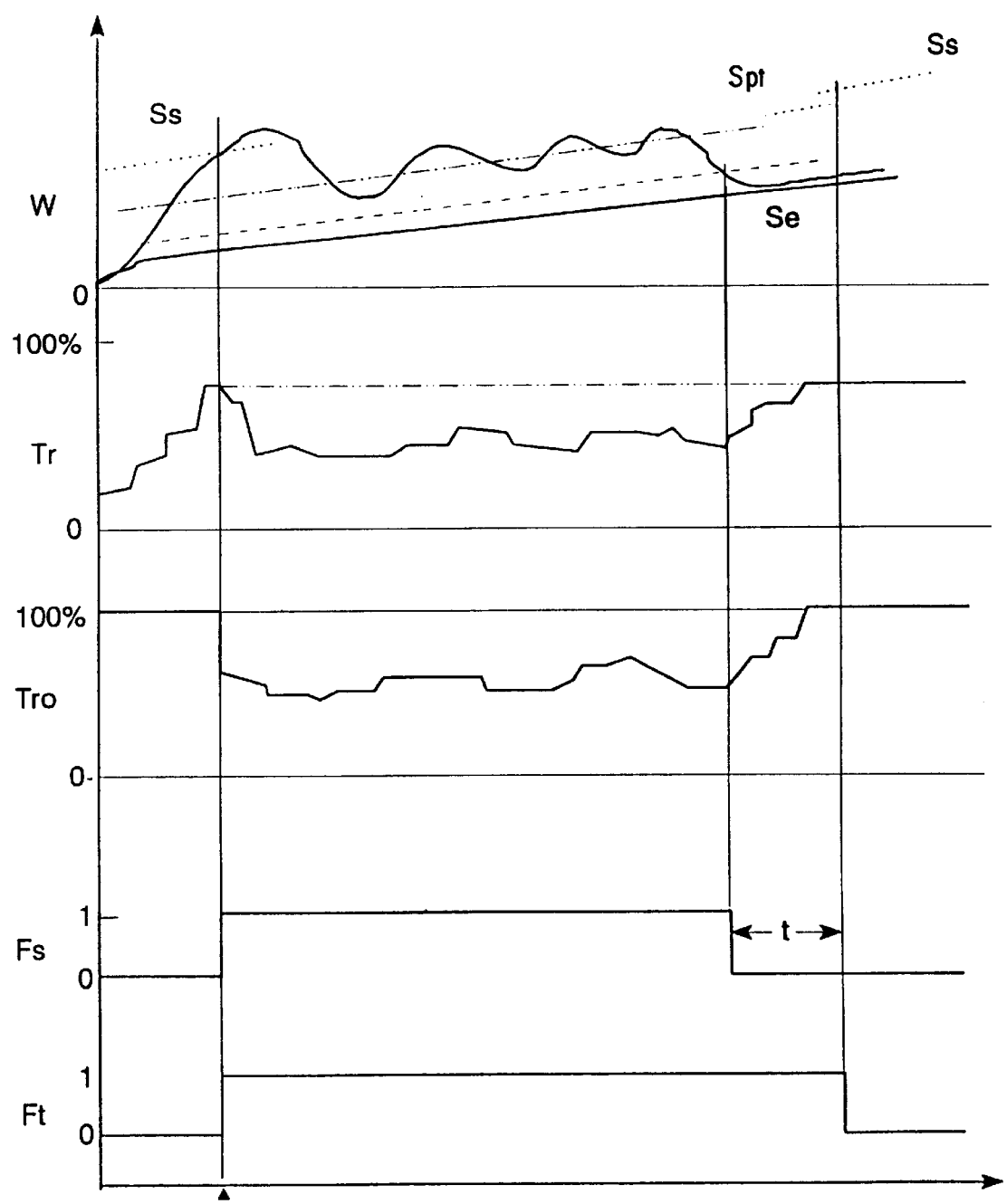
FIG. 26 is a time chart of traction control.
Figure 27:
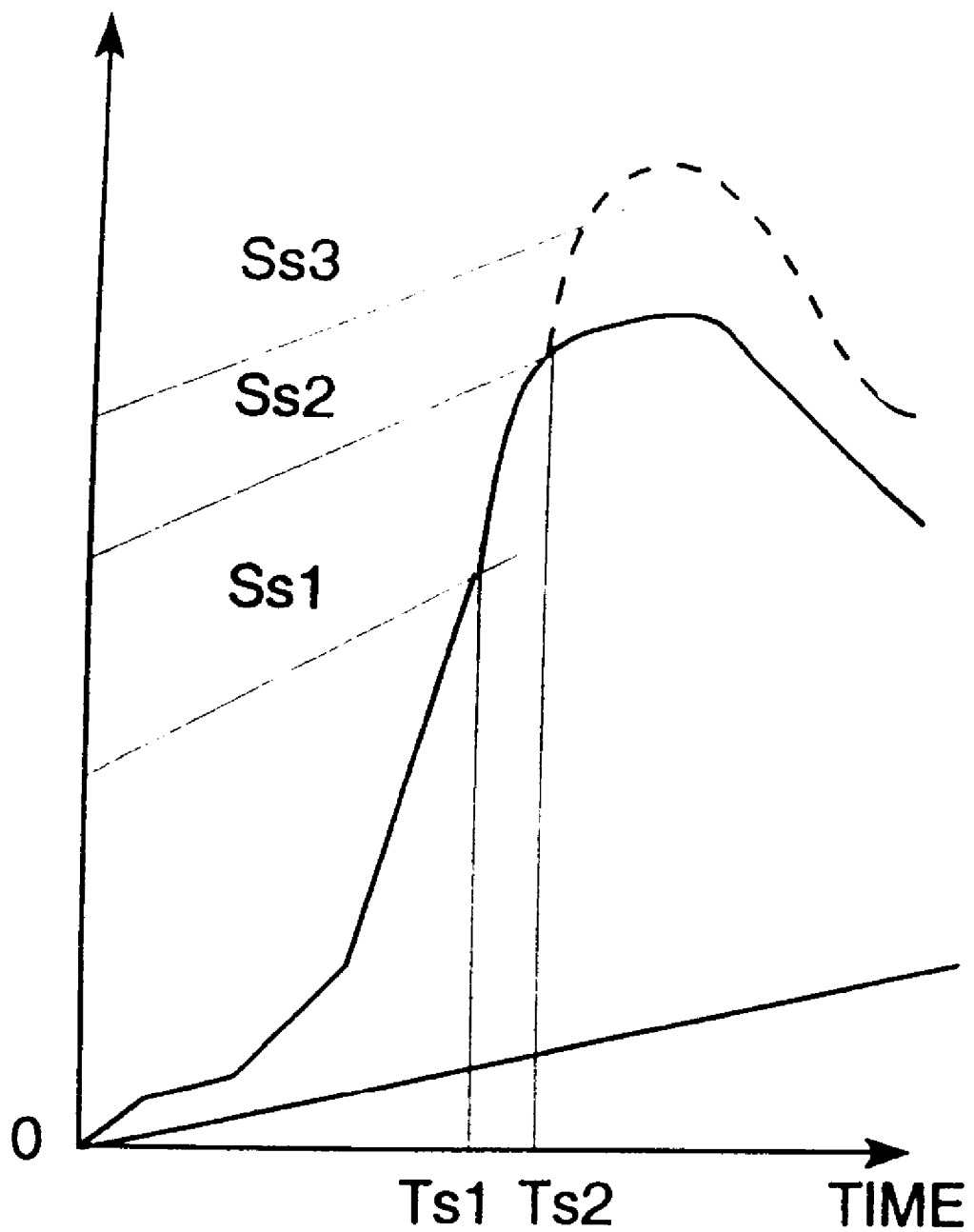
FIG. 27 is a diagram for illustrating the operation of the traction control.

The traction control commences when the greatest quantitative slippage SHi exceeds above the first control commencement threshold Ss, or otherwise when the drive wheel accelerations A1 and A2 exceed above the second control commencement threshold As. For example, when the greatest quantitative slippage SHi between the two drive wheels 1 and 2 exceeds the first control commencement threshold Ss for the first time, the traction control commences after setting up the slippage decision flag Fs. At this time, in order to indicate that the traction control is under execution, the traction control flag Ft is set up and the lamp 48 turns on. Immediately after the commencement of the traction control, the target engine output torque Tro drops at one fell swoop. That is, from the equation (V), the target engine output torque Tro is set, for instance, 2.4 Kgfm, and the No. 5 engine output torque map is selected for, for instance, an engine speed Ne of approximately 2,000 rpm. and an air pressure P of approximately −600 mmHg. Accordingly, a control level L of "4" is determined so as to deliver fuel in the specific injection pattern where two out of the six fuel injection valves is suspended from fuel injection. As a result, an effective engine output torque Tr drops down rapidly as compared with an engine output torque, shown by a double dotted line in FIG. 26, under no execution of the traction control, providing a reliable initial responsiveness of the engine. At this time, since, if the effective engine output torque Tr is high, the first control commencement threshold Ss or the second control commencement threshold As is large, so that the traction control does not commence until the greatest quantitative slippage SHi or the drive wheel accelerations A1 and A2 develop more larger. As shown in FIG. 27 as an example, setting first control commencement thresholds Ss1, Ss2 and Ss3 in the order of increasing value, the traction control commences at a time Ts1 for the first control commencement threshold Ss1 and at a time Ts2, later than the time Ts1, for the first control commencement threshold Ss2. This proves that the greater the effective engine output torque Tr becomes, the later the traction control commences. Further, when the effective engine output torque Tr reaches above the first control commencement threshold Ss3, the traction control does not commences until excessive quantitative slippage occurs as shown by a dotted line in FIG. 27. This proves that, when the effective engine output torque Tr is high under engine operating conditions ready for acceleration, the traction control is prevented from commencing with a delay and the engine control for lowering engine output torque is prevented from being repeated frequently, decreasing aggravation of acceleration performance.

During the execution of the traction control, the target engine output torque Tro increasingly or decreasingly changes so as to control the operation of engine 10 such that drive wheel quantitative slippage Sp1 and Sp2 converge at the target quantitative slippage Spt. For example, if the target engine output torque Tro is 2 Kgfm under the engine driving condition of an engine speed Ne of approximately 2,000 rpm. and an air pressure P of approximately −600 mmHg, the No. 6 engine output torque map is selected. Then, the engine control level L is changed from the level 4 to the level 5 so as to retard the ignition timing with remaining the number of fuel cut cylinders. As apparent from the fact that the equation (IX) is a function of the effective engine output torque Tr, the target engine output torque Tro unconditionally corresponds to the effective engine output torque Tr with a high accuracy. This leads to performing the engine output control with a high accuracy.

During the traction control in such a way, a target quantitative slippage Spt becomes larger with an increase in the effective engine output torque Tr, providing an increased target engine output torque Tro. As a result, an engine output torque drop is lowered, avoiding a significant acceleration loss. For example, if, as a result from high effective engine output torque Tr, the target engine output torque Tro is 2.8 Kgfm under the engine driving condition of an engine speed Ne of approximately 2,000 rpm. and an air pressure P of approximately −600 mmHg, the No. 4 engine output torque map is selected, providing the engine control level 3 so as to decrease the number of fuel cut cylinders from two to one and retard the ignition timing. On the other hand, if, as a result of low effective engine output torque Tr, the target engine output torque Tro is 1.2 Kgfm under the same engine driving condition, the No. 8 engine output torque map is selected, providing the engine control level L of "7". In the fuel injection pattern for the control level L of "7", four out of the six cylinders are subjected to cut fuel so as to cause a greater engine output torque drop. Accordingly, the engine control suppresses an engine output torque drop more when the effective engine output torque Tr is high as compared with when it is low, realizing the prevention of significant acceleration losses.

During repeated execution of the traction control, when The greatest quantitative slippage SHi for the drive wheels 1 and 2 reaches below the control termination threshold Se, the slippage decision flag Fs is reset down, and the engine control terminates the expiration of the predetermined queuing time t from the reset down of the slippage decision flag Fs following resetting down the traction control flag Ft.

Because the control termination threshold Se becomes large depending upon an increase in the effective engine output torque Tr, the engine control is brought into termination before the greatest quantitative slippage SHi has been lowered in excess. Consequently, the engine control terminates earlier when the effective engine output torque Tr is high as compared with low effective engine output torque Tr, providing a short time in which an acceleration loss occurs.

In the traction control, the equations (II) and (IV) for calculations of the first and second control commencement thresholds Ss and As may be replaced, for effective engine output torque Tr higher than a predetermined torque Tx, with the following equations (II') and (IV'), respectively:

$$Ss = Sso \cdot K1 \cdot K2 \cdot C \qquad (II')$$

$$As = Aso \cdot K1 \cdot K2 \cdot C \qquad (IV')$$

where C is an positive integer.

In such a case, the first and second control commencement thresholds Ss and As takes excessively large values, making the suspension of traction control more reliable. In this instance, the predetermined torque Tx is established so as to have a value which causes the traction control rather to provide aggravation of acceleration. Further, in order to compel the traction control to terminate earlier, the engine control may be compelled when the effective engine output torque Tr is higher than a predetermined torque Ty to select the No. 1 engine output torque map so as to develop ordinary engine driving or the traction control may be compelled to terminate with resetting down the slippage decision flag Fs or the traction control flag Ft. This leads to a short period of time in which an acceleration loss occurs.

In this instance, according to engine driving conditions, engine output torque found in a referred engine output torque map potentially falls within the torque down prohibition area of the map. For example, if the target engine output torque Tro is 0.6 Kgfm under the engine driving condition of an engine speed Ne of 500 rp. and the pressure of intake air P of −600 mmHg, the No. 8 engine output torque map is selected. However, the engine driving condition is involved in the torque down prohibition area. In such an event, the No. 7 engine output torque map is tentatively referred to. This No. 7 engine output torque map does not involve the engine driving condition in its torque down prohibition area, it is fixedly selected. As a result, the control level L of "8" is selected. The control level L of "8" defines the fuel injection pattern where three cylinders are suspended from fuel delivery, preventing the traction control from being reluctantly suspended and resuming thereafter. This results in controlling a sharp change in engine output torque, so as to impose a less burden on the driver.

In the traction control, the target quantitative slippage Spt may be changed so as to vary engine output torque according to driving conditions.

Figure 28:
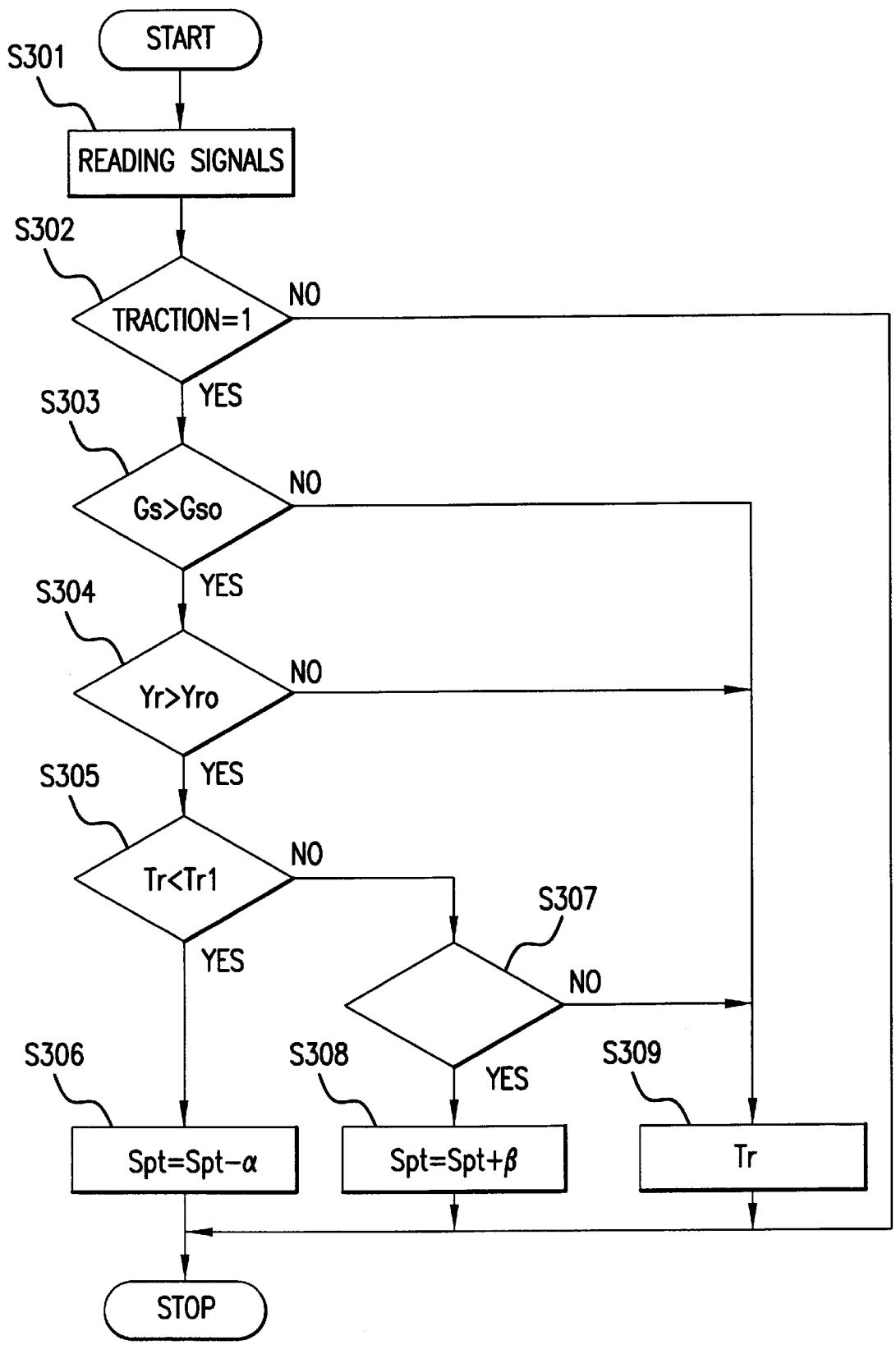
FIG. 28 is a flow chart illustrating a change control of target quantitative slippage for traction control.

FIG. 28 shows a flow chart illustrating a target quantitative slippage control routine. After reading various signals from at least the speed sensors 41–44, the steering angle sensor 45, the idle position sensor 46 and the brake position sensor 47 at step S301, a decision is made at step S302 as to whether the traction has been set up to the state of 1 (one). Whenever the answer to the decision is "NO," the routine directly returns. However, if the answer to the decision is "YES," another decision is made at step S303 as to whether a lateral acceleration Gs, which is calculated from the equation (I), is larger than a predetermined lateral acceleration Gso. If the answer to the decision is "YES," a decision is made at step S304 as to whether a yaw rate Yr is larger than a predetermined basic rate Yro. The yaw rate is calculated from the following equation (X):

$$Yr = Vr^2 / 9.8L \cdot \tan(\theta / Rg) \qquad (X)$$

where L is the wheel base of a vehicle; and

Rg is the gear ratio of a steering gear.

If the yaw rate Yr is larger than the predetermined basic rate Yro, then, another decision is made at step S305 as to whether the effective engine output torque Tr determined in the engine control unit 30 is less than a first predetermined torque Tr1. If the answer to the decision is "YES," the target quantitative slippage Spt is decreased by a predetermined value α at step S306. On the other hand, if the answer to the decision is "NO," then, another decision is subsequently made at step S307 as to whether the effective engine output torque Tr is higher than a second predetermined torque Tr2 which is higher than the first predetermined torque Tr1. If the answer to the decision is "YES," then, the target quantitative slippage Spt is increased by a predetermined value β at step S308.

On the other hand, if the answer to any one of the decisions made at steps 303, S304 and S307 is "NO," then, the effective engine output torque Tr remains unchanged. After resetting the effective engine output torque Tr at any one of steps S306, S308 and S309, the routine returns.

Assuming that a lateral acceleration Gs and a yaw rate Yr are larger than the basic lateral acceleration Gso and basic yaw rate Yro, the target quantitative slippage Spt is decreased by the predetermined value α when effective engine output torque Tr is higher than the first predetermined torque Tr1. As a result, the target engine output torque Tro is made lower as compared with ordinary driving conditions, enhancing suppression of engine output torque. This improves the stability of vehicle body by means of decreased engine output torque during driving, lightening the burden imposed on the driver.

On the other hand, under the driving conditions where effective engine output torque Tr is higher than the second predetermined torque Tr2, the target quantitative slippage Spt is increased by the predetermined value β, resulting in the target engine output torque Tro made higher as compared with ordinary driving conditions. As a result, the suppression of engine output torque is relaxed, improving acceleration during turning. If effective engine output torque Tr is between these first and second predetermined torque Tr1 and Tr2, the target quantitative slippage Spt remains. In such a case, target engine output torque Tro is determined according to a lateral acceleration Gs, so as to cause suitable torque down for turning conditions, whereby providing improved running performance. If a decision of slippage of the drive wheels 1 and 2 is made during turning, a lateral acceleration Gs and effective engine output Tr are memorized upon a occurrence of such slippage. In addition, if a lateral acceleration Gs develops larger during execution of the traction control than upon a occurrence of slippage, the target engine output torque Tro is controlled so that effective engine output torque does not excess effective engine output torque upon an occurrence of slippage. Accordingly, improved acceleration performance is ensured during turning without aggravation of the stability of vehicle body. Furthermore, when an engine speed Ne and effective engine output torque Tr decrease at rates less than predetermined rates, respectively, the vehicle is decided to be driving a slope and the engine is controlled to restrain torque down. This results in providing appropriate driving force during slope driving. If there occurs an increase in quantitative slippage for the drive wheels 1 and 2 during a drop in effective engine output torque Tr, it is decided that there occurs a shift-up spin and an engine output torque drop is suppressed.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A traction control system for a vehicle for controlling engine output torque during an occurrence of excessive slippage of drive wheels to restrain an excess of driving force, said traction control system comprising:
   slippage detection means for detecting quantitative slippage of the drive wheels relative to a road surface on which the vehicle runs;
   engine driving condition detection means for detecting engine driving conditions of the engine;
   engine output detection means for detecting output torque from said engine of the vehicle based on said engine driving conditions and engine output characteristics corresponding to said engine driving conditions; and
   control means for determining a target engine output torque corresponding to a first specified quantitative slippage as a target during traction control based on said output torque and said quantitative slippage with which traction control starts when said quantitative slippage is greater than a second specified quantitative slippage so that said target engine output torque becomes greater as said output torque increases and executing engine output control of said engine to attain said target engine output torque.

2. A traction control system as defined in claim 1, wherein said engine output characteristics correspond to a plurality of torque drop control modes, respectively, and said control means estimates engine output torques based on said engine driving conditions and said engine output characteristics when said target engine output torque is determined, comparing each said estimated engine output torque with said target engine output torque to select one of said engine output characteristics which includes the closest estimated engine output torque to said target engine output torque, and controlling said engine in said torque control mode corresponding to said selected engine output characteristic.

3. The traction control system as defined in claim 2, wherein said selection of one of said engine output characteristics is prohibited under specified engine driving conditions.

4. The traction control system as defined in claim 3, wherein when the closest estimated engine output torque to said target engine output torque is contained in one of the said engine output characteristics which is prohibited from being selected under said corresponding engine driving conditions, said control means selects another engine output characteristic which provides a torque drop lower than said one engine output characteristic and is permitted to be selected under said specified engine driving conditions.

5. The traction control system as defined in claim 1, wherein said engine driving condition is defined by a rotational speed and a load of the engine.

6. The traction control system as defined in claim 2, wherein said selection of one of said engine output characteristics is prohibited under specified engine driving conditions.

7. The traction control system as defined in claim 6, wherein when the closest estimated engine output torque to said target engine output torque is contained in one of said engine output characteristics which is prohibited from being selected under said corresponding engine driving conditions, said control means selects another output characteristic which provides a torque drop lower than said one engine output characteristic and is permitted to be selected under said specified engine driving conditions.

8. The traction control system as defined in claim 1, wherein said control means commences said engine output control when said quantitative slippage is greater than said second specified quantitative slippage, terminates said engine output control when said quantitative slippage is less than a third specified quantitative slippage smaller than said second specified quantitative slippage, and modifies said third specified quantitative slippage to a larger value as said output torque increases.

9. The traction control system as defined in claim 8, wherein said control means interrupts said engine output control when said output torque is higher than a first specified torque.

10. The traction control system as defined in claim 1, wherein said control means prohibits said engine output control when said output torque is higher than a first specified torque.

11. A traction control system as defined in claim 1, further comprising yaw rate detection means for detecting a yaw rate occurring on the vehicle, wherein said control means changes a drop in said output torque for said quantitative slippage greater than said second specified quantitative slippage so as to be greater when said yaw rate is greater than a specified yaw rate and said output torque is less than a specified torque than when said yaw rate is greater than said specified yaw rate and said output torque is not less than said specified torque.

12. The traction control system as defined in claim 11, wherein said control means changes said first specified quantitative slippage so as to be smaller when said yaw rate is greater than said specified yaw rate and said output torque is less than said specified torque than when said yaw rate is greater than said specified yaw rate and said output torque is not less than said specified torque.

13. The traction control system as defined in claim 1, further comprising a yaw rate detection means for detecting a yaw rate occurring on the vehicle, wherein said control means changes a drop in said output torque for said quantitative slippage greater than said second specified quantitative slippage so as to be smaller when said yaw rate is greater than a specified yaw rate and said output torque is less than a specified torque than when said yaw rate is greater than said specified yaw rate and said output torque is not less than said specified torque.

14. The traction control system as defined in claim 13, wherein said control means changes said first specified quantitative slippage so as to be greater when said yaw rate is greater than said specified yaw rate and said output torque is less than said specified torque than when said yaw rate is greater than said specified yaw rate and said output torque is not less than said specified torque.

15. The traction control system as defined in claim 11, wherein said yaw rate detection means comprises a speed sensor for detecting a running speed of said vehicle, an angle sensor for detecting a steering angle by which said vehicle is negotiated to turn and determines said yaw rate based on said running speed and said steering angle.

16. The traction control system as defined in claim 13, wherein said yaw rate detection means comprises a speed sensor for detecting a running speed of said vehicle, an angle sensor for detecting a steering angle by which said vehicle is negotiated to turn and determines said yaw rate based on said running speed and said steering angle.

17. The traction control system as defined in claim 1, wherein said control means determines said first specified quantitative slippage based on said output torque and said quantitative slippage so as to be greater as said output torque becomes greater, and determines said target engine output torque so as to be greater as a difference of said quantitative slippage from said first specified quantitative slippage becomes smaller.

18. The traction control system as defined in claim 1, wherein as said output torque increases, said second specified quantitative slippage becomes greater.

19. The traction control system as defined in claim 1, wherein said second specified quantitative slippage is greater than said first specified quantitative slippage.

20. A traction control system for a vehicle for controlling engine output torque during an occurrence of excessive slippage of drive wheels so as to restrain an excess of driving force, said traction control system comprising:

slippage detection means for detecting quantitative slippage of said drive wheels relative to a road surface on which the vehicle runs;

engine driving condition detection means for detecting engine driving conditions of the engine;

engine output detection means for detecting an output torque from an engine of the vehicle based on said detected engine driving conditions and engine output characteristics corresponding to said engine driving conditions;

wheel speed detection means for detecting a changing rate of a speed of said drive wheels; and control means for determining a target engine output torque suitable for said drive wheels to produce a specified quantitative slippage based on said output torque and said quantitative slippage when said changing rate is greater than a specified changing rate so that said target engine output torque becomes greater as said output torque increases, and executing engine output control of said engine to attain said target engine output torque.

21. A traction control system for a vehicle for controlling engine output torque during an occurrence of excessive slippage of drive wheels so as to restrain an excess of driving force, said traction control system comprising:

slippage detection means for detecting quantitative slippage of said drive wheels relative to a road surface on which the vehicle runs;

engine driving condition detection means for detecting engine driving conditions of the engine;

engine output detection means for detecting an output torque from an engine of the vehicle based on said detected engine driving conditions and engine output characteristics corresponding to said engine driving conditions;

wheel speed detection means for detecting a changing rate of a speed of said drive wheels; and control means for determining a target engine output torque suitable for said drive wheels to produce a specified quantitative slippage based on said output torque and said quantitative slippage when said changing rate is greater than a specified changing rate so that said target engine output torque becomes greater as said output torque increases, and executing engine output control of said engine to attain said target engine output torque at a threshold for said changing rate which is determined to be greater as said output torque becomes higher.

22. A method of controlling engine output torque during an occurrence of excessive slippage of drive wheels on a vehicle to restrain an excess of driving force, comprising:

detecting quantitative slippage of said drive wheels relative to a road surface on which the vehicle runs;

detecting engine driving conditions of the engine;

detecting output torque from said engine of the vehicle based on said engine driving conditions and engine output characteristics corresponding to said engine driving conditions; and determining a target engine output torque corresponding to a first specified quantitative slippage as a target during traction control based on said output torque and said quantitative slippage with which traction control starts when said quantitative slippage is greater than a second specified quantitative slippage so that said target engine output torque becomes greater as said output torque increases and executing engine output control of said engine to attain said target engine output torque.

23. A method of controlling engine output torque during an occurrence of excessive slippage of drive wheels on a vehicle so as to restrain an excess of driving force, comprising:

detecting quantitative slippage of said drive wheels relative to a road surface on which the vehicle runs;

detecting engine driving conditions of the engine;

detecting output torque from said engine of the vehicle based on said engine driving conditions and engine output characteristics corresponding to said engine driving conditions; and determining a target engine output torque corresponding to a first specified quantitative slippage as a target during traction control based on said output torque and said quantitative slippage with which traction control starts when said quantitative slippage is greater than a second specified quantitative slippage, which is greater as said output torque increases, so that said target engine output torque becomes greater as said output torque increases and executing engine output control of said engine to attain said target engine output torque.

24. A traction control system for a vehicle for controlling engine output torque during an occurrence of excessive slippage of drive wheels, comprising:

a traction control unit detecting quantitative slippage of the drive wheels relative to a road surface on which the vehicle travels, detecting an output torque from the engine of vehicle based on engine driving conditions and engine output characteristics corresponding to said engine driving conditions, and determining a target engine output torque based on said quantitative slippage and said engine output torque; and an engine control unit detecting the engine driving conditions of the engine, and executing engine output control of the engine to attain said target engine output torque when the quantitative slippage is greater than a second specified quantitative slippage so that said target engine output torque becomes greater as said engine output torque increases.

* * * * *